United States Patent [19]

Rijkaart

[11] Patent Number: 4,770,619
[45] Date of Patent: Sep. 13, 1988

[54] ROLLING APPARATUS FOR FORMING A CONTINUOUS STRIP OF DOUGH OR A SIMILAR PLASTIC MATERIAL

[75] Inventor: Cornelis Rijkaart, Kortenhoef, Netherlands

[73] Assignee: Machinefabriek C. Rijkaart B.V., Asperen, Netherlands

[21] Appl. No.: 24,815

[22] Filed: Mar. 12, 1987

[30] Foreign Application Priority Data

Mar. 26, 1986 [NL] Netherlands ................ 8600780
Nov. 12, 1986 [NL] Netherlands ................ 8602872

[51] Int. Cl.$^4$ ............................................. A21C 3/02
[52] U.S. Cl. ............................... 425/96; 264/175; 425/101; 425/329; 425/367; 426/502; 426/517
[58] Field of Search ............... 264/175; 426/502, 517; 425/96, 98–101, 105, 107, 133.1, 329, 331, 333, 335, 328, 367

[56] References Cited

U.S. PATENT DOCUMENTS

| | | |
|---|---|---|
| 3,205,837 | 9/1965 | Fay .................................. 425/99 |
| 4,113,412 | 9/1978 | Hayashi ........................... 425/335 |
| 4,117,054 | 9/1978 | Salo ................................. 264/175 |
| 4,192,636 | 3/1980 | Hayashi et al. ................. 425/96 |
| 4,212,609 | 7/1980 | Fay .................................. 425/100 |
| 4,631,017 | 12/1986 | Hayashi ........................... 425/335 |

FOREIGN PATENT DOCUMENTS

| | | |
|---|---|---|
| 76295 | 10/1954 | Netherlands . |
| 73.13887 | 4/1975 | Netherlands . |
| 77.14214 | 6/1979 | Netherlands . |
| 83.04377 | 7/1985 | Netherlands . |
| 781343 | 8/1957 | United Kingdom . |

*Primary Examiner*—Jay H. Woo
*Assistant Examiner*—C. Scott Bushey
*Attorney, Agent, or Firm*—Kramer, Brufsky & Cifelli

[57] ABSTRACT

Rolling apparatus comprising two rollers (FIG. 1) or (FIG. 2) disposed horizontally adjacent to each other, one roller of which has a rough surface. Above the gap between these rollers is a stock holder with an open bottom end. Dough placed in the holder falls onto the rollers and is conveyed by the roller through the gap, so that a strip of dough leaves the gap. Disposed below the gap is a third roller which is parallel to the two top rollers. Rotatably mounted on the periphery of the roller are a number of rolls. The strip of dough goes from the gap through a gap between the bottom roller and the top roller (FIG. 1) or (FIG. 2), which is preferably a roller of the same type as the bottom roller, opposite the top roller with rough surface, so that the rolls make the strip of dough thinner, while retaining its structure.

11 Claims, 2 Drawing Sheets

ROLLING APPARATUS FOR FORMING A CONTINUOUS STRIP OF DOUGH OR A SIMILAR PLASTIC MATERIAL

BACKGROUND OF THE INVENTION

The invention relates to an apparatus for the continuous rolling of dough and similar plastic materials to a continuous strip, provided with a stock holder, and three rollers which are disposed below the holder and are connected to a drive mechanism, with one top roller having a rough surface for conveying the dough out of the holder, and with the central axes running parallel and the distances between the peripheries of the rollers and the drive mechanisms of the rollers being such that going from the holder the strip is formed and conveyed between one of the rollers and each of the other rollers.

An apparatus of this type is known from Dutch Pat. No. 76,295. In the known apparatus the central axes of three rollers are at different levels, the bottom and the top roller have approximately the same diameter, the middle roller has a larger diameter, for example, twice the size, the top roller has a rough surface, the other two rollers have smooth surfaces, between the middle roller and each of the other rollers there is a gap to permit passage of the dough, and disposed between the bottom and top rollers opposite the middle roller provision is made for a filler piece which with the rollers forms a pressure chamber for the dough. The peripheral speeds of the bottom and middle rollers are the same. During operation, in which the stock holder is full of dough or another similar plastic material, the top roller with the rough surface conveys the dough through the gap between the top roller and the middle roller into the pressure chamber, where—particularly in the case of soft types of dough—it is compressed and then discharged down through the gap between the middle roller and the bottom roller. The continuous strip formed in the process is removed from the peripheries of the bottom rollers by means of knives.

It is important that during the processing of yeast dough products the number of carbon dioxide cells developed in the dough through the working of the yeast should increase in a second proving period. In the known apparatus, the pressing of the dough between the rollers and into the pressure chamber for the purpose of obtaining a continuous strip less than about 15 mm thick breaks the structure of the dough, and the walls of the gas cells developed in a previous rising period are broken. The continuous strip thus obtained consists of a so-called dead dough, in which the number of gas cells increases little, if at all, during a second proving period, while the dough does rise again. After further processing of the strip of dough and baking of it, a bread product with large gas cells is obtained, so that the bread product can retain relatively little moisture and soon becomes stale. In practice therefore, only strips with minimum thickness of about 15 mm can be obtained with the known apparatus.

SUMMARY OF THE INVENTION

The object of the invention is to eliminate the disadvantages of the known apparatus. The object is achieved in that according to the invention in the apparatus of the type, mentioned in the preamble two of the rollers are disposed next to each other with a gap between them to allow the passage of the strip, the third roller is disposed approximately centered below the gap, the third roller on the periphery consists of a number of rotatably mounted rolls running parallel to the central axes of the rollers, and the peripheral speed of the third roller is greater than the peripheral speed of each top roller with rough or smooth surface.

Here, the gap between the top roller can be selected so that it is larger relative to the thickness of the continuous strip obtained with the apparatus, which means that the dough is not pressed much between the top rollers. The strip emerging from the gap between the top rollers is conveyed downwards over the rolls and against the top roller. Since the bottom roller in the process moves at a great peripheral speed compared with the peripheral speeds of the top rollers with rough or smooth surface, and the rolls disposed on the periphery of the bottom roller are rotatably mounted, the rolls will push in front of them a wall of dough, in which process the dough is flattened in a manner similar to that where a thick slab of dough is made thinner by hand with a rolling pin. The structure of the dough is retained in the process, so that during a second proving period the number of carbon dioxide cells developed through the working of the yeast increases appreciably, with the dimensions of the cells being relatively small. The finer texture of the dough thus obtained means that a product baked from this dough will be able to retain moisture for a relatively long time, so that the baked product remains soft and keeps longer. With the apparatus according to the invention, it is possible to obtain very good quality strips of dough which are only 5 mm thick.

A preferred embodiment of the apparatus according to the invention is such that the one top roller opposite the other top roller with rough surface on the periphery consists of a number of rotatably mounted rolls which run parallel to the central axes of the rollers. This practically rules out the possibility of pressure chambers being produced between the rollers. The good structure will be better retained as a result.

BACKGROUND OF SOME DETAILS

From Dutch Patent Application No. 73.13887 and British Pat. No. 78.1343 rolling apparatuses with two rollers disposed below an inlet piece adjacent to each other with a gap between them and a third roller disposed below are known per se. The distance between the bottom roller and a top roller is greater there than the distance between the two top rollers. The peripheries of the three rollers are all smooth. The known apparatuses are intended for feeding in a piece of dough through the inlet piece into the gap, so that a slab of dough is formed between the top rollers and is let down onto the bottom roller, after which it is rolled up, by means of flexible friction elements disposed opposite the bottom roller, between said elements and the periphery of the bottom roller. The known apparatuses are not suitable for the continuous conveyance of dough from a stock holder and the formation of a continuous strip of dough.

From Dutch Patent Applications Nos. 77.14214 and 83.04377 the use is known per se of a rotating driven rolling machine which acts upon a layer of dough which is supplied from a supply belt and is conveyed onto a discharge belt through a gap formed between the rolling machine and a counter-surface which is disposed opposite the rolling machine and makes a peripheral movement. In the region of the gap a pre-shaped layer of dough, consisting in particular of a number of layers of different materials, is rolled, so that a less thick layer is obtained. The speeds of the conveyor belts, the rolling machine and the counter surface must be synchronized here, and are dependent on the dimensions of the different elements, the thickness of the layer supplied and the desired thickness of the layer discharged. These known apparatuses are not suitable for the continuous transportation of dough from a stock holder into and through a gap between a rolling machine and a counter surface which is disposed opposite it and carries out a peripheral movement.

It is pointed out that the proposal for the apparatus according to the invention was found to produce a very surprisingly good result. Contrary to what was initially feared, the dough coming out of the gap between the two top rollers did not accumulate in the roughly triangular space formed by the three rollers, which would have meant that the structure of the dough would have been seriously damaged, just as in the pressure chamber in the apparatus according to Dutch Pat. No. 76.295.

BRIEF DESCRIPTION OF THE DRAWINGS

The invention is explained with reference to the figures. In the figures.

DETAILED DESCRIPTION OF PREFERRED EMBODIMENTS

Figure 1:
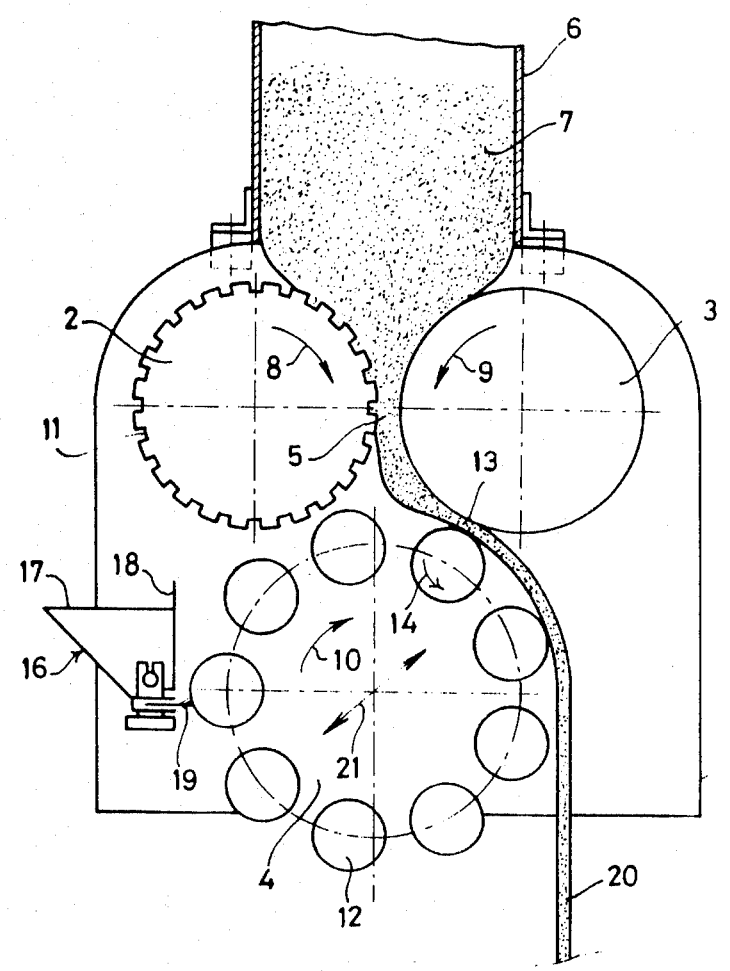
FIG. 1 shows a first embodiment of the apparatus according to the invention.

The apparatus shown in FIG. 1 comprises a frame 1 and three horizontal rollers 2, 3, 4 rotatably mounted parallel to each other in flanges of the frame 1. The two top rollers 2, 3 with approximately equal diameter, are disposed adjacent to each other with a gap 5 between them. Disposed above the region of the gap 5 is a stock holder 6 for a quantity of dough 7 or another similar plastic material. The upright walls of the stock holder 6, which run parallel to the central axes of the rollers 2, 3, are slanted at an angle of about 1 degree, so that the distance between the walls increases downwards.

The rollers 2, 3, 4 are driven rotatably by means of drive mechanisms (not shown) in the directions indicated by the arrows 8, 9 and 10 respectively.

Formed in the periphery of the top roller 2 are grooves 11 which run parallel to the central axis of the roller 2, and which give a good grip on the dough 7 present in the holder 6 for conveying the dough out of the holder 6 downwards through the gap 5. The rollers 2 and 3 act here as pre-shaping devices.

The roller 4 is disposed approximately centered below the gap 5 and is provided on its periphery with a number of rolls which run parallel to the central axis of the roller 4 and are rotatably mounted in flanges of the roller 4.

The dough leaving the region of the gap 5 between the top rollers 2, 3 is conveyed over the rolls 12 of the roller 4 and thereby passes a gap 13 formed between the top roller 3 and the roller 4. Since the rolls 12 come into contact with the dough in the region of the gap 13, the rolls 12 therein will roll over the dough in the direction indicated by the arrow 14.

The peripheral speed of the roller 4 is selected to be about ten (or anywhere between about five and fifteen) times the peripheral speeds of the top rollers 2 and 3. This means that the rolls 12 will always push part of the dough ahead of them in the form of a wall, the height of the wall decreasing as the rolls 12 go closer to the gap 13. In this way the dough is flattened, and one obtains a continuous strip of dough in which the cell structure of the carbon dioxide gas developed by the yeasts is retained. The number of cells can thereby increase substantially during a second providing period, so that a fine texture is obtained, as a result of which a product formed from this dough and baked can retain moisture longer, and remains soft and keeps longer.

Disposed on the other side of the roller 4, in the center region thereof parallel to the roller 4 is an oblong flour sprinkler 16. The flour sprinkler 16 comprises a container 17 for a quantity of flour. The dimensions of the horizontal cross section of the container 17 decrease downwards. The container 17 has on the underside an opening, the vertical dimension of which can be set by means of a slide 18. Disposed in the opening is an oblong brush 19, which projects so far outwards that the end part thereof is caused to vibrate by the passing rolls 12. In the process, flour from the container 17 will be deposited on the rolls 12, which prevents the dough from sticking to the rolls 12. In addition, flour will fall onto a conveyor belt (which is not shown) which discharges the strip 20 of dough coming out of the rolling apparatus. This prevents the strip 20 of dough from sticking to the conveyor belt.

The smooth surfaces of the roller 3, the holder 6 and the rolls 12 with which the dough comes into contact are preferably provided with a coating with low coefficient of friction, for example Teflon (trade mark).

The roller 4 is preferably movable in the direction indicated by the double arrow 21, so that a continuous strip 20 with adjustable thickness can be obtained.

Figure 2:
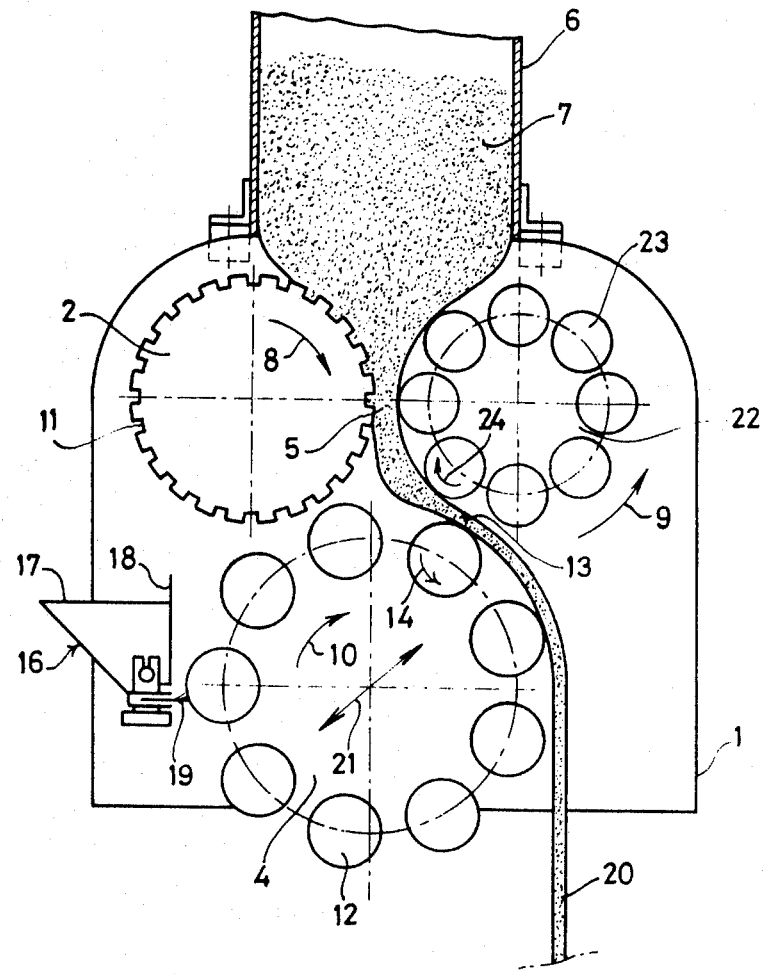
FIG. 2 shows a second embodiment of the apparatus according to the invention.

In the second embodiment of the apparatus according to the invention shown in FIG. 2, the top roller 3 with smooth surface of FIG. 1 is replaced by a roller 22 with roller 23 running parallel to the central axes of the rollers 2, 4, 22 said rolls 23 being rotatably mounted along the periphery of the roller 22. The roller is driven in the direction of the arrow 9, so that the rolls 23 turn in the direction of the arrow 24. Although this is not indicated in the figure, the position of the roller 22 is preferably adjustable relative to the other rollers 2, 4.

In the apparatus according to FIG. 2 practically any occurence of a pressure chamber in which the walls of the gas cells present in the dough would be undesirably broken is prevented. With the apparatus according to FIG. 2, an even thinner dough strip of good quality can therefore be obtained.

The rolls 12, 23 of the rollers 4, 22 could possibly be driven by means of a friction element acting upon the rolls, such as a brake shoe.

I claim:

1. An apparatus for continuously rolling dough or similar deformable materials into a continuous strip, said apparatus comprising:
    a stock holder;
    first and second rollers rotatably supported adjacent to each other beneath said stock holder to receive a deformable material therefrom and having generally parallel axes of rotation, said first roller having a rough surface to engage and thereby convey with said second roller material received from said stock holder through a gap between said first and second rollers;
    a third roller rotatably supported underneath said gap to receive material deposited approximately vertically thereon by said first and second rollers through said gap, and having an axis of rotation generally parallel to the axes of rotation of said first and second rollers, said third roller including on its periphery a plurality of rotatably mounted rolls having axes approximately parallel to the axis of the third roller; and drive means for rotating said first, second and third rollers, the peripheral speed of said third roller being greater than the peripheral speed of said first and second rollers, and wherein the distances between the peripheries of said first and second rollers and said rolls, and the speeds and directions of the drive means are such that a strip of the material is formed and conveyed first between the first and second rollers and then between the second roller and said rolls.

2. An apparatus as set forth in claim 1 wherein said third roller is approximately centered beneath said gap.

3. An apparatus according to claim 1, wherein the peripheral speed of the third roller is about five to fifteen times the peripheral speed of the first and second rollers.

4. An apparatus according to claim 1, wherein the position of the third roller relative to the first and second rollers is adjustable by means of setting elements.

5. An apparatus according to claim 1, wherein the second roller includes a number of rotatably mounted rolls having axes approximately parallel to the axis of the second roller.

6. An apparatus according to claim 5, wherein the position of the second roller is adjustable relative to the first and third rollers.

7. An apparatus according to claim 1, wherein the holder includes a pair of upright walls which are essentially parallel to planes containing the axes of the rollers, and the distance between said walls increases slightly downwardly.

8. An apparatus according to claim 7, wherein said walls are inclined at an angle of about 1 degree relative to each other.

9. An apparatus according to claim 1, wherein the surfaces of the holder and the rollers which contact the dough are provided with a coating having a low coefficient of friction.

10. An apparatus according to claim 1, further comprising means, supported about halfway up the third roller, for sprinkling flour directly on the rolls of the third roller.

11. An apparatus according to claim 10, wherein the flour sprinkler means comprises a flour container and a brush supported such that one end of the brush is located in an opening of the container to receive flour therefrom and the other end contacts the rolls of the third roller, whereby contact with the rolls causes the brush to vibrate and flour to proceed along the brush and onto the rolls.

* * * * *